(12) United States Patent
Axelrod et al.

(10) Patent No.: US 8,235,008 B2
(45) Date of Patent: Aug. 7, 2012

(54) FOLDABLE/COLLAPSIBLE STRUCTURES

(75) Inventors: Glen S. Axelrod, Colts Neck, NJ (US); Ajay Gajria, Monmouth Junction, NJ (US); Zhenghong Tao, Spring Lake, NJ (US)

(73) Assignee: T.F.H. Publications, Inc., Neptune City, NJ (US)

( * ) Notice: Subject to any disclaimer, the term of this patent is extended or adjusted under 35 U.S.C. 154(b) by 1159 days.

(21) Appl. No.: 11/564,084

(22) Filed: Nov. 28, 2006

(65) Prior Publication Data

US 2008/0121188 A1 May 29, 2008

(51) Int. Cl.
*A01K 1/03* (2006.01)
(52) U.S. Cl. ...................... 119/499
(58) Field of Classification Search ............ 119/168, 119/453, 496–499; 220/6, 666; 229/117.01, 229/198.1
See application file for complete search history.

(56) References Cited

U.S. PATENT DOCUMENTS

| | | | |
|---|---|---|---|
| 3,195,506 A | | 7/1965 | Beard |
| 4,903,637 A | * | 2/1990 | Devault .................. 119/497 |
| 4,940,016 A | | 7/1990 | Heath |
| 5,493,818 A | * | 2/1996 | Wilson .................. 52/71 |
| 5,950,568 A | | 9/1999 | Axelrod et al. |
| 5,967,090 A | * | 10/1999 | Hui .................. 119/497 |
| 6,131,534 A | | 10/2000 | Axelrod |
| 6,216,638 B1 | | 4/2001 | Pivonka et al. |
| 6,408,797 B2 | | 6/2002 | Pivonka et al. |
| 6,863,030 B2 | | 3/2005 | Axelrod |
| 7,021,242 B2 | | 4/2006 | Axelrod |
| 7,025,019 B2 | | 4/2006 | Axelrod et al. |
| 7,347,164 B2 | | 3/2008 | Axelrod |
| 2006/0162670 A1 | | 7/2006 | Axelrod et al. |

OTHER PUBLICATIONS

Glen Axelrod and Walter Lee, Junior Party (U.S. Appl. No. 09/914,047) v. Scott Pivonka and John Tottleben, Senior Party (Patent 6,408,797 B2); Patent Interference No. 105-507 (Technology Center 3600); Affidavit of Edward A. Heath. Dated: Feb. 2, 2007. 8pgs.
International Search Report and Written Opinion dated Jun. 18, 2008 issued in related International Patent Application No. PCT/US0785806. 7 pages.

* cited by examiner

Primary Examiner — Rob Swiatek
Assistant Examiner — Valentina Xavier
(74) Attorney, Agent, or Firm — Grossman, Tucker, Perreault & Pfleger, PLLC

(57) ABSTRACT

The present invention relates to a collapsible/foldable structure that may include a top roof and a bottom platform. A pair of sidewalls may be provided each of which may be pivotally attached to the roof. The sidewalls may include at least two side section such as an upper and middle section. The sidewalls may also include a lower side section. The upper and middle sections may be pivotally attached to one another and the middle and lower side section may be pivotally attached to one another so that the upper and middle sidewall sections can be pivoted inwardly towards the bottom platform to provide a collapsed condition. The sidewalls may also each contain an outer and an inner surface thereof wherein the outer surface of the upper side wall and the outer surface of the adjacent middle side wall form an angle that is greater than 180 degrees when the structure is in an expanded or collapsed condition. In addition, the inner surface of the middle wall section may overlie the inner surface of the upper wall section in a collapsed condition.

21 Claims, 14 Drawing Sheets

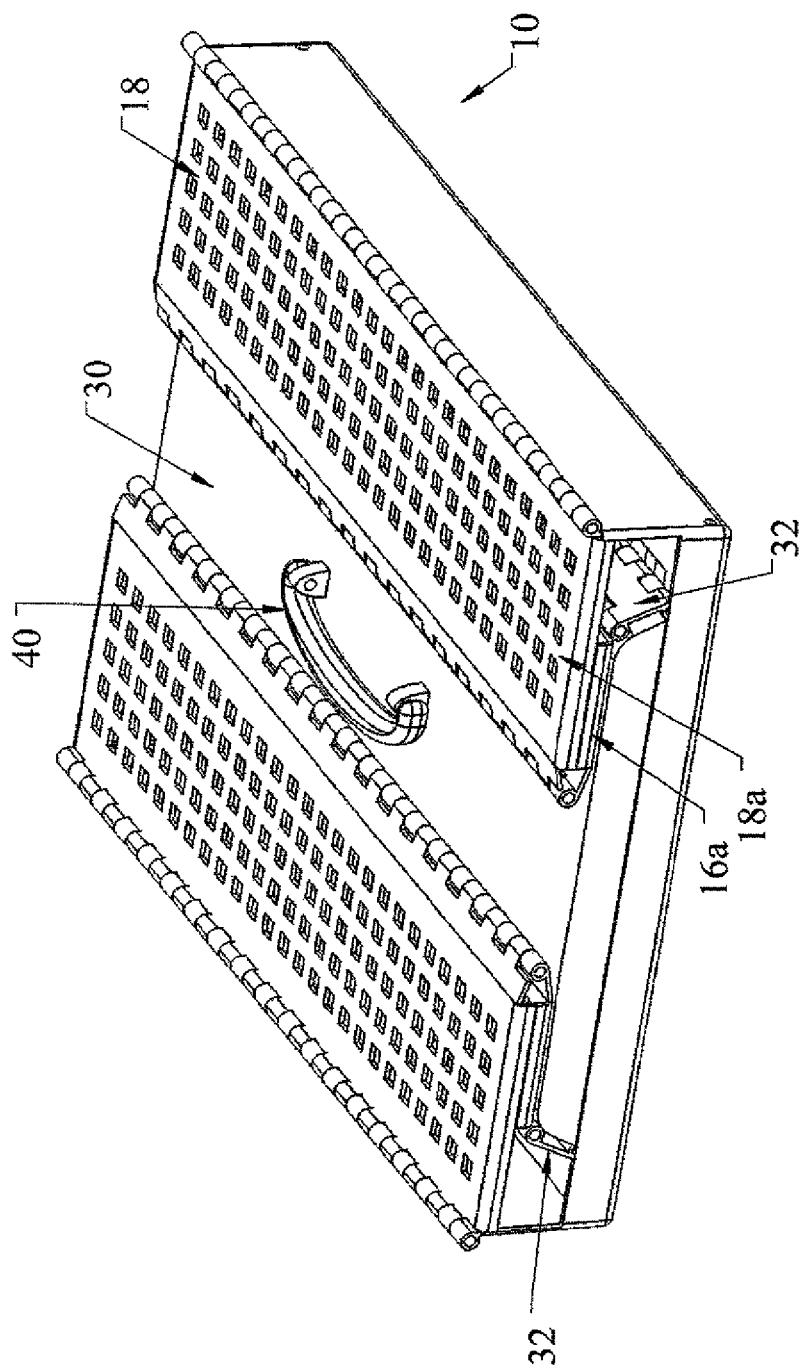
FIG. 4

US 8,235,008 B2

FOLDABLE/COLLAPSIBLE STRUCTURES

FIELD OF THE INVENTION

The present invention relates to foldable/collapsible structures, and more particularly to a lightweight animal shelter having increased storage space when expanded and a compact shape when collapsed. The shelter may therefore be readily converted from an expanded to a compact condition for ease of storage and/or transport, and also may present itself as an attractive and/or classic looking doghouse design when fully deployed. This invention also relates to a pet carrier transportation device and in particular to a collapsible/foldable pet carrier or portable structure that may provide safe and sanitary temporary housing for a pet during transport. Furthermore, the present invention may also apply to collapsible storage containers, including such containers as a cooler, or ice chest, which has generally rigid walls, yet can be collapsed or folded into a configuration which takes up much less space, and can therefore be easily stored and/or transported. Finally, the invention herein also may apply to a collapsible structure in general, e.g., a collapsible consumer waste container.

BACKGROUND OF THE INVENTION

A fair amount of disclosures have been put forward in recent years, seeking to develop a foldable/collapsible structure primarily for use as an animal shelter. More specifically, a number of pet houses and enclosures have been proposed with the purpose of providing a sleeping area for a pet and for confining a pet, when necessary, for example, when traveling.

A number of solutions have been proposed to provide improved structures, including those disclosed in U.S. Pat. Nos. 5,950,568; 6,131,534; 7,021,242; 7,025,019 and United States Patent Application Publication No. 2006/0162670, all commonly assigned to the assignee of the present invention and included herein by reference in their entirety.

Turning to a background consideration relating to pet carriers, it is noted that a variety of pet carriers have been also been reported in the prior art, all aimed in one form or another to facilitate pet transportation. Specifically, pet carriers are commonly used by pet owners for carrying their pets on trips or as a means for containing the pets when the pets are shipped from one point to another. Pet carriers also commonly double as sleeping quarters for the pet as the owner may contain the pet overnight to prevent the pet from wandering and potentially damaging the home or hotel room which the owner is occupying.

BRIEF DESCRIPTION OF THE DRAWINGS

Features and advantages of the present invention will be clear from the following description of exemplary embodiments consistent with the present invention, which description should be considered in conjunction with the accompanying drawings, wherein:

FIG. 4 is a perspective view of the collapsible/foldable structure of FIG. 3 in a fully collapsed/folded condition.

FIG. 6 is a perspective view of the exemplary embodiment of FIG. 5 in a partially collapsed condition, illustrating the angle that the external surfaces of the upper and middle side walls pivot through.

SUMMARY OF THE INVENTION

Figure 1:
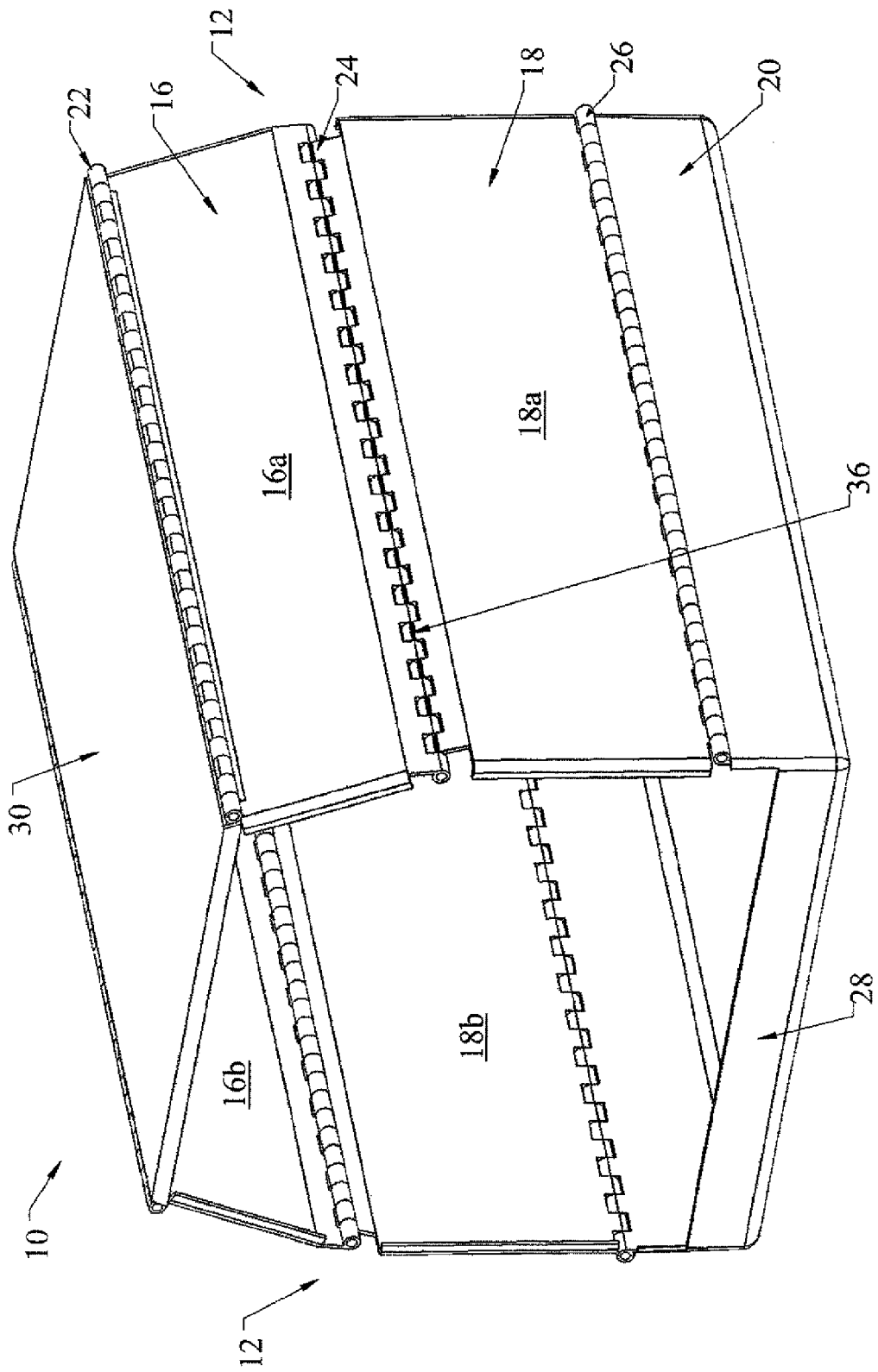
FIG. 1 is a perspective view of one exemplary embodiment of the collapsible/foldable structure of the present invention in an expanded condition.

In exemplary embodiment the present invention relates to a collapsible/foldable structure comprising a roof and a base defining a top and bottom of said structure and a lower side section on the base. A pair of sidewalls may be provided comprising at least two sections, each which may be pivotally attached to the roof to facilitate inward collapse of the sidewalls when said sidewalls are pivoted toward the base. The sidewalls may comprise upper and middle sections wherein the upper and middle sections may be pivotally attached to one another and wherein the roof may collapse downwardly towards the base. The sidewalls may include an outer and an inner surface thereof, the middle wall section being pivotally attached to the lower side section to permit folding of the middle sidewall inwardly toward the base. The upper wall section may be pivotally attached to the middle wall section to permit the middle wall section inner surface to collapse into an overlying position with the inner surface of the upper wall section. The roof may be pivotally connected to the two upper sidewall sections to permit the roof to be collapsed towards the base.

In a second exemplary embodiment, a relatively wide hinge panel may pivotally attach the top roof to the upper side walls, adding height to the structure without increasing the footprint (floor area) of the structure. The relatively wide hinge panel may include two hinges in a spaced apart relationship and may be of a flexible material. The structure may also include a handle for carrying the collapsed compact structure or for carrying the structure in an expanded condition containing a pet.

In a third exemplary embodiment, the structure may include curved rather than flat side walls and a curved roof. In addition, the structure may include an access door in the top roof for easily accessing the pet carried inside.

In a fourth exemplary embodiment, the structure may include a relatively wide hinge panel between the upper side wall and the middle sidewall alone or in combination with a relatively wide hinge panel between the top roof and the upper side wall to provide even more height and storage space without sacrificing the footprint of the structure.

In a fifth exemplary embodiment, the structure may include a curved top roof and/or side walls in combination with relatively wide hinge panels attaching the upper side walls to the top roof and middle side walls.

In a sixth exemplary embodiment, the structure may include flexible lower sidewalls which are an extension of the base and are capable of bending such that the inside surface may overlie the inside surface of the adjacent upper panel when the structure is in a collapsed condition.

The foldable/collapsible structure of the present invention may find uses, including but not limited to, a pet carrier, a pet shelter, a collapsible storage container or temperature conditioning device for storing, for instance, perishable and non-perishable goods.

DETAILED DESCRIPTION OF THE INVENTION

Turning next to a more detailed description of the various preferred embodiments of the present invention, as illustrated in FIG. 1, the collapsible/foldable structure of the present invention is shown generally at 10 in an expanded or use condition with the front panel removed, and comprising a pair of sidewalls 12. Sidewalls 12 may contain at least two panels, for example an upper 16, middle 18 and lower section 20. Lower section 20 as illustrated may be vertically disposed on said base or bottom platform 28. This may be understood as any lower section 20 that has a vertical component of height relative to said base or bottom platform. For example, the vertical component may be angled with respect to the base or bottom platform. The lower section 20 may also be permanently affixed to the base, separately formed and attached to the base, or even hinged to the base. As shown, lower section 20 may be hinged to middle section 18.

As can be seen, the sidewalls may be pivotally connected, which may be accomplished by hinges 22, 24, 26. The hinges may be disposed on the outer surfaces 16a, 18a of the upper and middle sections 16, 18 such that when said sidewalls are collapsed the structure may convert to a compact shape for carrying or storage (see FIG. 2).

The upper 16 and middle 18 sections may specifically collapse inwardly and towards the base or bottom platform 28. That is, the upper 16 and middle 18 sections of the side walls 12 may have outer surfaces 16a, 18a, respectively, which form an angle therebetween of greater than 180 degrees when the structure is in an expanded condition as shown in FIG. 1. In addition, upper sidewall 16 may be pivotally attached to roof section 30 by hinge 22. Front panel 29 has been removed for clarity in FIG. 1, while rear panel 34 cannot be seen. Both of these panels may fold down against the base 28 and allow the sidewalls 12 to collapse thereupon or the front and rear panels may be removed before the side walls are collapsed.

The hinges 22, 24, 26 are shown may be "piano" hinges comprising leaf sections attached to the outer surface of the side wall sections and connected by a set of knuckles engaging a pin. These hinges may be formed of metal or plastic. However, it is contemplated that any sort of pivoting mechanism that will allow the upper and middle sections to move such that the angle formed between their respective outer surfaces may increase from about 180 degrees to about 360 degrees may be used. For instance, the hinges may be friction hinges which may independently maintain the structure in an expanded condition until sufficient force is applied to collapse the structure.

Figure 2:
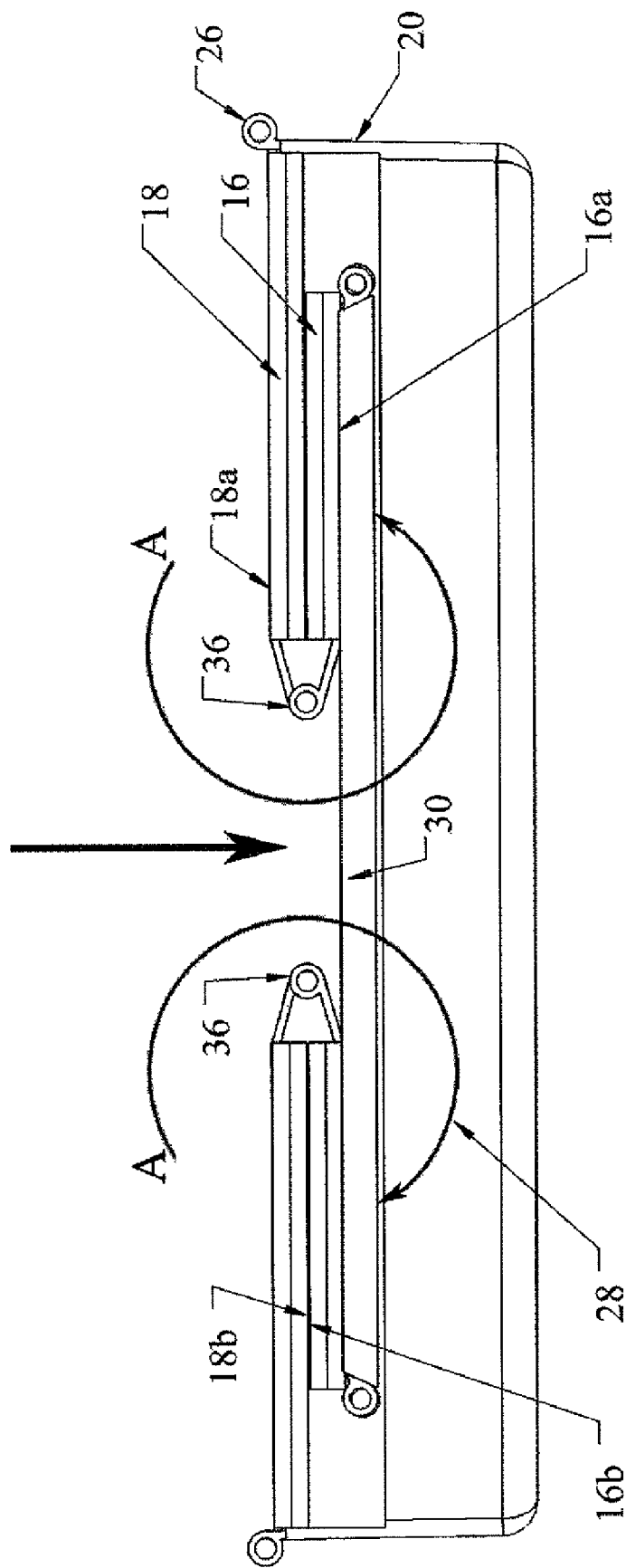
FIG. 2 is a front view of the collapsible/foldable structure of the FIG. 1 in a fully collapsed/folded condition.

To prevent the upper section 16 and middle section 18 from collapsing inward such that the angle between their respective outer surfaces 16a, 18a may form an acute angle, a stop 36 (see FIG. 13) may be included on the outer surface of middle section 18 in the area of hinge 24. This stop 36 may be of a type, for instance, that is attached to the lower leaf of hinge 24 and which protrudes upwards from one or more of the knuckles of the lower leaf such that it forms an interference with the upper leaf of hinge 24 and substantially prevents buckling of hinge 24 inward relative to sections 16 and 18. One or more of these stops may be employed per side 12 as shown in FIGS. 1 and 2.

Figure 13:
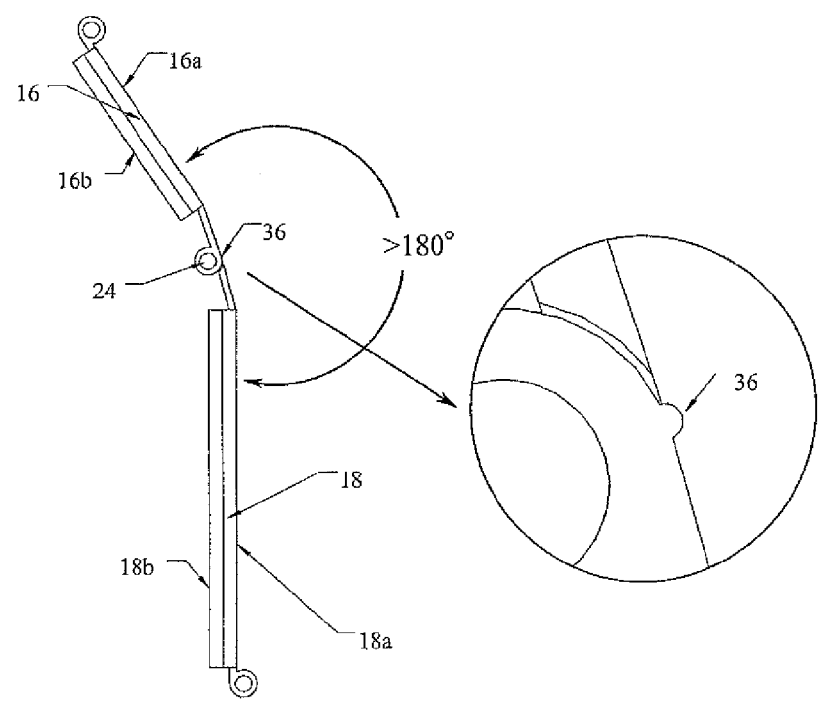
FIG. 13 is a partial sectional view of a hinge connecting the upper and middle side sections and including a stop to prevent overtravel of the hinge.

FIG. 13 illustrates a partial sectional view of an exemplary stop 36 which may prevent overtravel of hinge 24 between upper section 16 and middle section 18. In other words, to prevent hinge 24 from moving inward and thus allowing the outer surfaces 16a, 18a of the upper and middle sections, respectively, to form an acute angle therebetween, stop 36 extends into the path of the upper leaf of hinge 24 and only allows the outer wall surfaces to form an angle greater than 180°. One example of a stop 36 is shown in the exploded view of FIG. 13. Other examples of stops are known in the art.

In addition, it is contemplated that at least some of the plurality of hinges connecting the sidewall sections may be "living hinges", that is, a thin flexible molded web of material which connects two rigid bodies together and has excellent fatigue resistance. In that regard, living hinges generally comprise a polyolefin, preferably polypropylene, and may be molded as an integral part of one or more of the sidewalls. In the present invention, the living hinge may also comprise a relatively thinned section which connects the inner surfaces of the upper, middle and/or lower sidewalls to allow hinging.

Figure 12:
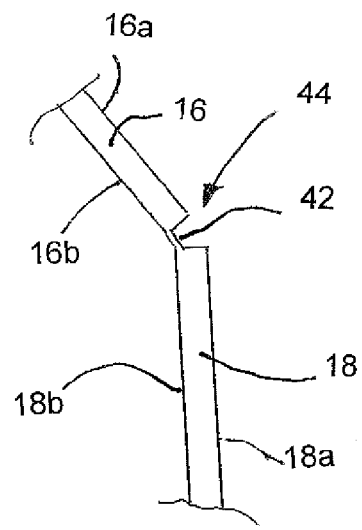
FIG. 12 is a partial sectional view of a living hinge connecting two side sections.

FIG. 12 is a partial sectional view of a living hinge 42 connecting upper section 16 to middle section 18, the hinge 42 formed integrally with the sections 16, 18 and extending from the inner surfaces 16b, 18b of those sections. It is further contemplated that a living hinge may be formed separately and mechanically attached to the side sections, much as the hinges 22, 24, 26 and 32 are shown. Note that the gap 44 between the side sections 16 and 18 which overlies the living hinge 42, may function as a stop to prevent the sides 16, 18 from buckling inward at the hinge and allowing the respective outer surfaces 16a, 18a to form an acute angle to one another.

In addition, while the embodiments show that the hinges extend in one piece for the full length of the structure, it is contemplated that shorter sections of hinges may be spaced apart (discontinuous) along the length of the structure to provide the necessary pivoting action of the side sections. In all of the following embodiments, it should be noted that the sidewall sections 16, 18 and 20 may hinge on either the inner surfaces 16b, 18b or the outer surfaces 16a, 18a of the sidewalls depending upon whether the hinge is moving outwardly or inwardly during the collapsing motion. That is, placing the hinge on the inner or outer sidewall surface may become necessary because of the thickness required for the wall construction and the amount of rotation of the side wall sections during collapse of the structure.

Attention is next directed to FIG. 2, which illustrates the collapsible/foldable structure of the present invention in a collapsed state. As illustrated therein, the upper 16 and middle 18 sidewall sections are collapsed and disposed inward and into the structure 10. FIG. 2 is a front view of the collapsed structure illustrating how the roof 30 is collapsed downwardly towards the base 28. Due to the hinged connections of the sidewall sections, upper section 16 pivots under middle section 18 such that the angle formed by the outer surfaces 16*a*, 18*a* increases to nearly 360 degrees, and never forms an acute angle. This motion is generally indicated by arrows A in FIG. 2.

In addition, inner surfaces 16*b*, 18*b* of the upper and middle sidewall sections, respectively, now generally overlie one another in adjacent fashion. This action thus provides for relatively easy collapse or folding of the structure from an expanded condition (FIG. 1) wherein the roof 30 is held up by the front and rear panels 29, 34 (not shown) to the compact condition shown in FIG. 2. Accordingly the roof 30 and/or side walls 12 may releasably engage the front 29 and rear 34 panels when they are in an upright and the carrier is in a non-collapsed configuration. This then may provide a measure of structural integrity to the collapsible/foldable structure of the present invention. The hinges employed may be friction hinges which may independently maintain the structure in an expanded condition until sufficient force is applied to collapse the structure. Note also that stops 36 are shown protruding from hinge 24 which may prevent the upper and middle outer surfaces 16*a*, 18*a*, respectively, from forming an acute angle therebetween.

Figure 3:
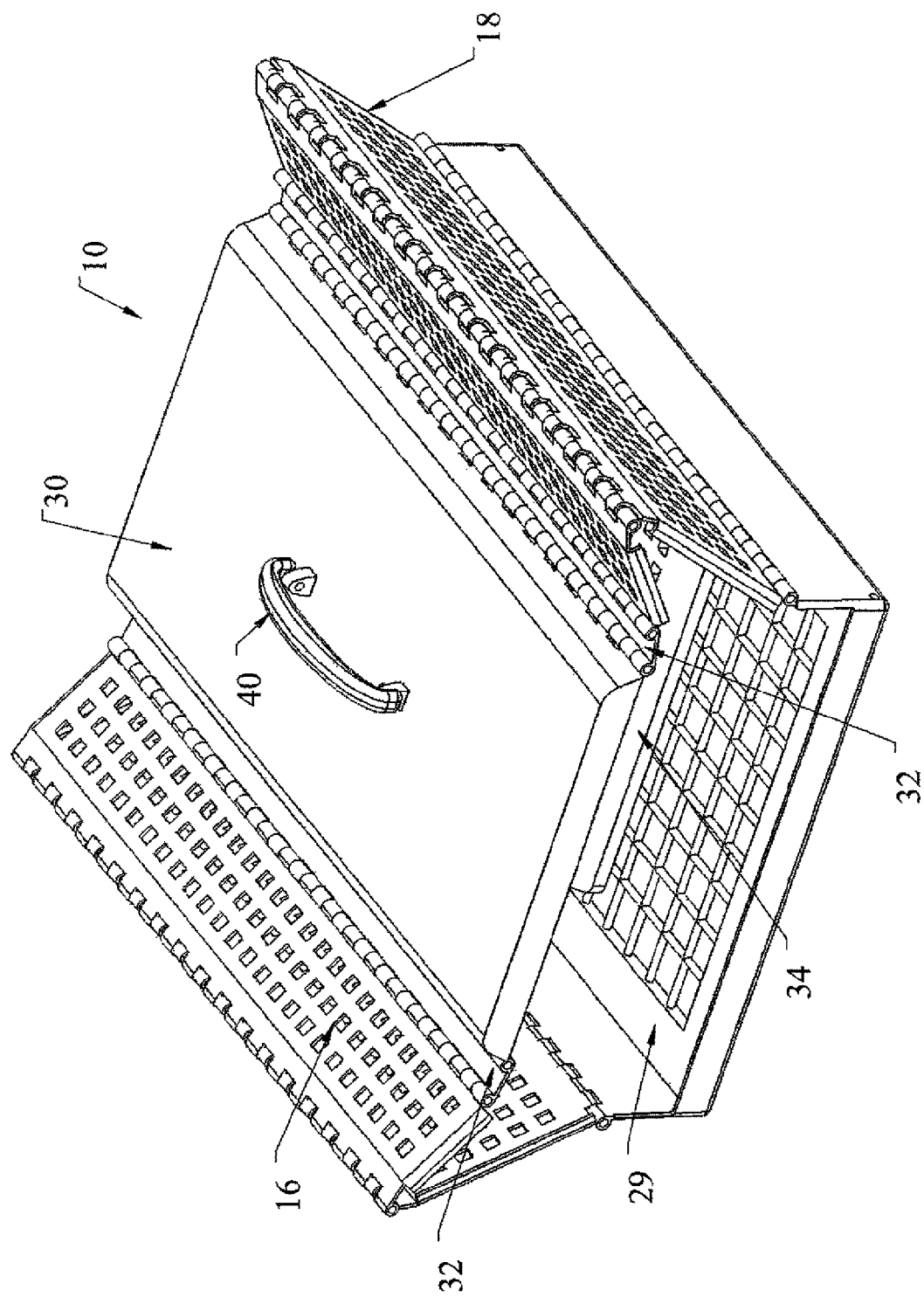
FIG. 3 is a perspective view of a second exemplary embodiment of the collapsible/foldable structure of the present invention, in a partially collapsed/folded condition, illustrating a wide hinge and a carrying handle.

FIG. 3 illustrates in perspective view a second exemplary embodiment of the present invention, in a partially collapsed condition. Here, the roof 30 has been outfitted with a folding handle 40 for ease of carrying the structure in a collapsed or expanded condition. FIG. 3 further illustrates the front 29 and rear 34 panels already folded into the base, overlying one another and allowing the sidewalls 12 to collapse. While preferred embodiments of the invention provide that the front and rear walls are pivotally attached to the lower sidewall section 20 so that they can be folded inwardly and beneath the side walls and roof, they may also be physically removed from the front and rear openings. When in the expanded condition, the front and rear walls may act to further support the sides and roof, and when the front and rear walls are completely removed from the structure they can be either placed on top of the structure, inside or underneath and then optionally be bound up with suitable fastening so that the complete structure can be shipped as one package. The end panels as well as the side walls may, as shown, comprise a mesh or perforated structure to allow for airflow for pets being transported.

A further feature of this exemplary embodiment is the use of a hinge panel 32 that may be located, for instance, between the upper side wall section 16 and the roof 30 as illustrated in FIG. 3. This hinge panel 32 may be relatively wider than a normal hinge (essentially two hinges back to back, yet spaced apart) but relatively narrower than the upper section 16, and thus provide additional height to the structure which may then provide additional space within the structure. This additional space also will not come at the expense of the footprint (base area) as the hinge panel 32 can be allowed to collapse along the side of the roof 30 into the base 28 (see FIG. 4).

The hinge panel 32 may comprise nearly any material, including, but not limited to, metal, plastic, cloth and leather. An additional feature may be provided by a hinge panel that is flexible, e.g. of cloth, leather, or plastic, such as thermoplastic elastomer or thermoplastic olefin, such that upon collapse, the hinge panel may bend or flex to conform to an available space. Thus, the height of the structure may be increased to allow storage of larger items, such as certain pets, yet take up relatively minimal space when collapsed.

FIG. 4 is a perspective view of the structure of FIG. 3 in a fully collapsed condition. Once again, the upper and middle sections, 16, 18 of the sidewalls 12 have rotated inwardly from a position where the outer surfaces 16*a*, 18*a* of those walls form an angle of greater than 180 degrees to a position where the angle now may approximate 360 degrees. Of note are the hinge panels 32 which now in a folded condition may lie outboard of the roof 30. It may therefore be appreciated that if the hinge panels were flexible, they could fold upon themselves somewhat to take up even less space. The resultant collapsed structure may therefore provide a substantially flat, readily transportable device which is easily stored.

Figure 5:
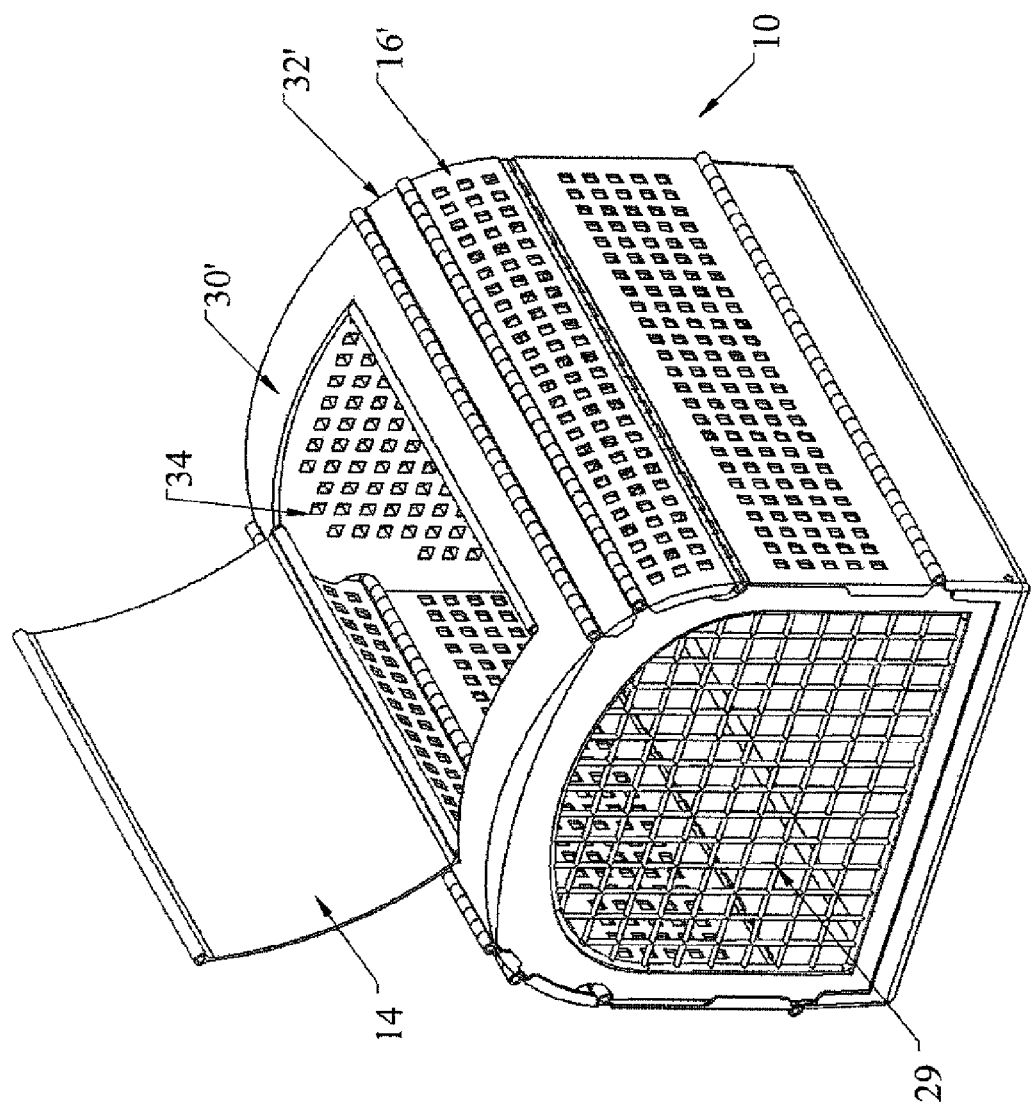
FIG. 5 is a perspective view of a third exemplary embodiment of the collapsible/foldable structure of the present invention, in an expanded condition, illustrating curved upper side walls and a top access panel.

FIG. 5 is a perspective view of another exemplary embodiment of the present invention, illustrating in perspective view, a structure 10 in an expanded condition having a curved roof 30', curved sidewalls 16' and curved hinge panels 32'. Also shown in this view are front panel 29 and rear panel 34 in an erect position, forming a pet carrier. An additional feature of this exemplary embodiment is an access panel 14 which may be pivotally connected to the roof 30 and allow access to the contents of the structure through the roof. Although not shown, it is contemplated that the front panel 29 and/or rear panel 34 may also include access doors. By using curved panels for the roof 30', upper section 16' and hinge panel 32', additional storage space may be created, again without increasing the relative footprint or floor area of the structure 10.

Figure 6:
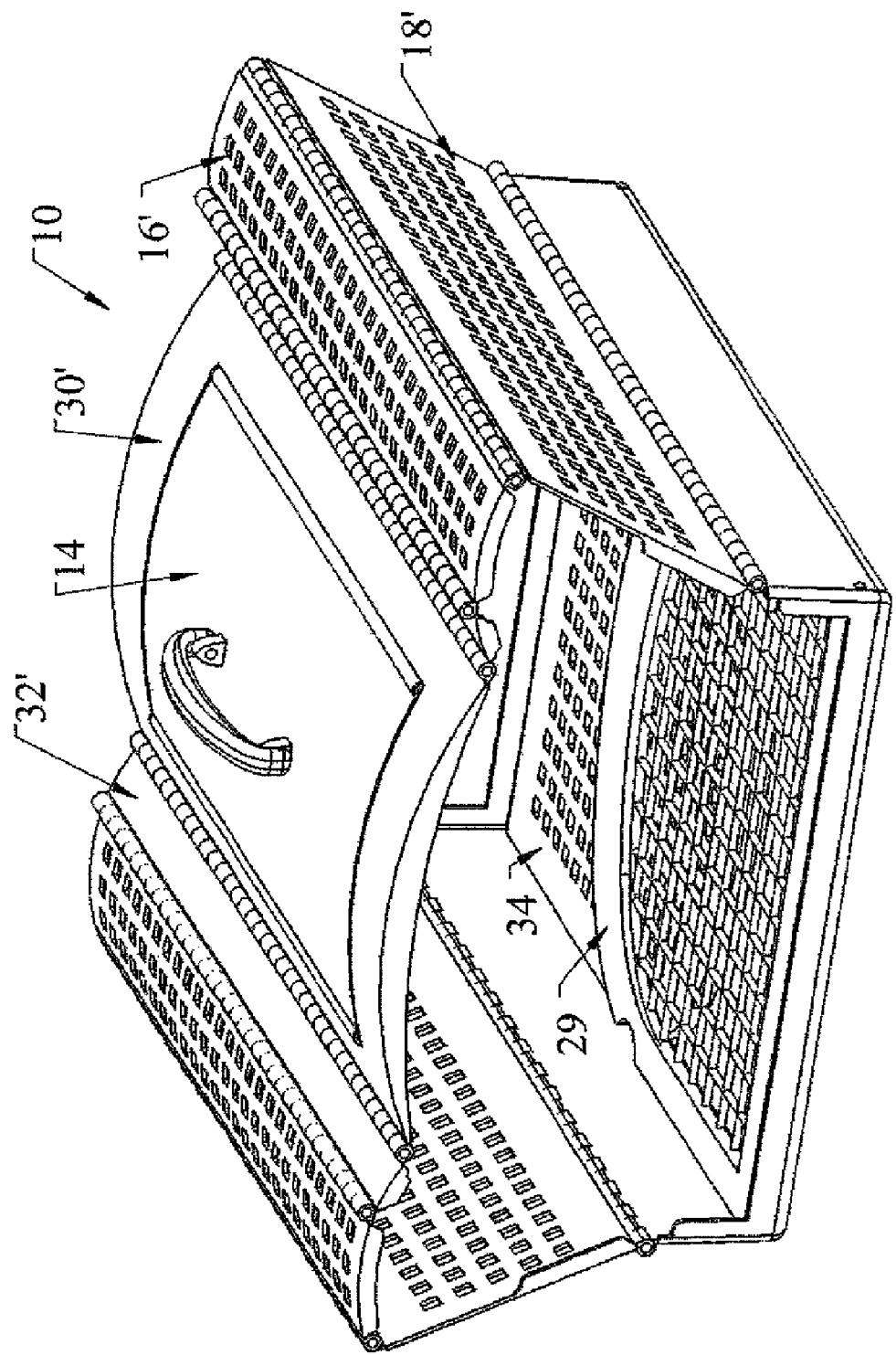

FIG. 6 is a perspective view of the structure of FIG. 5 in a partially collapsed condition illustrating the angular movement of upper section 16' in relation to middle section 18' and hinge panel 32' in relation to upper section 16'. In addition, the front 29 and rear 34 panels have been folded onto the base 28.

Figure 7:
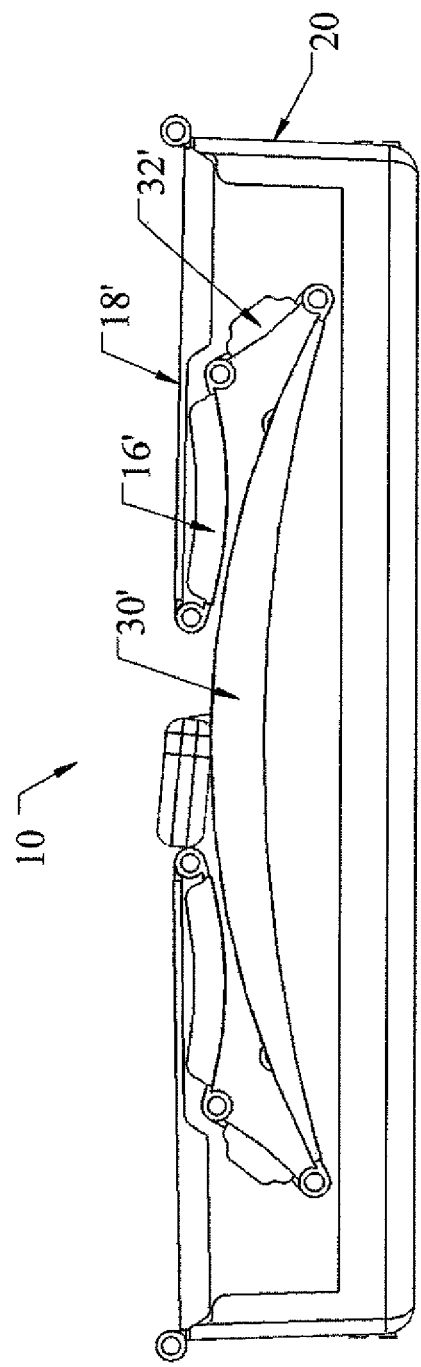
FIG. 7 is an end view of FIG. 6 illustrating the structure of FIG. 5 in a fully collapsed and compact condition.

FIG. 7 is an end view of the structure of FIG. 5 in a fully collapsed condition.

Figure 8:
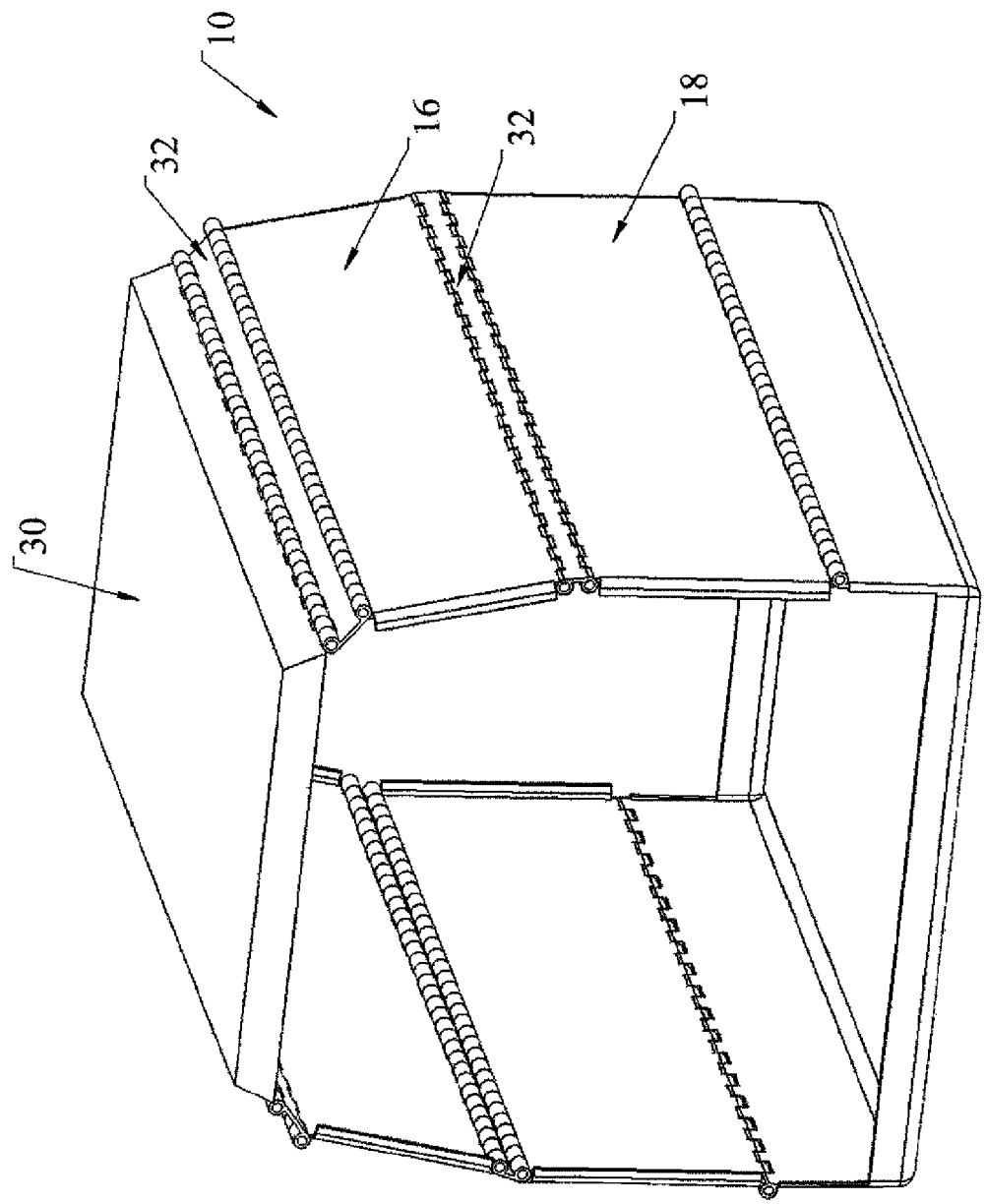
FIG. 8 is a perspective view of a fourth exemplary embodiment of the present invention, illustrating two wide hinges per side, providing additional height and storage space.
Figure 8A:
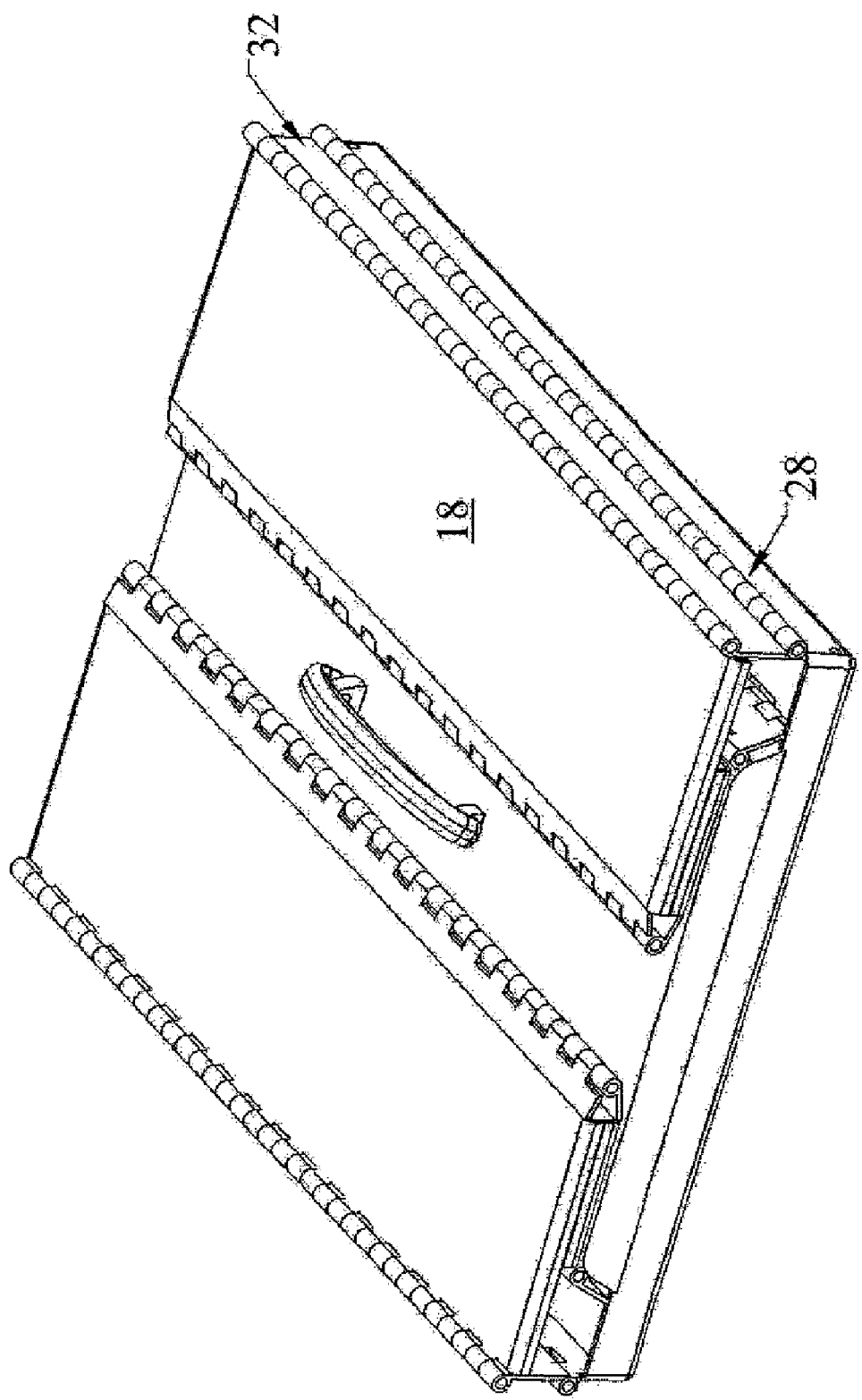
FIG. 8A is another perspective view illustrating a hinge panel connecting the middle and lower side sections in a collapsed condition.
Figure 9:
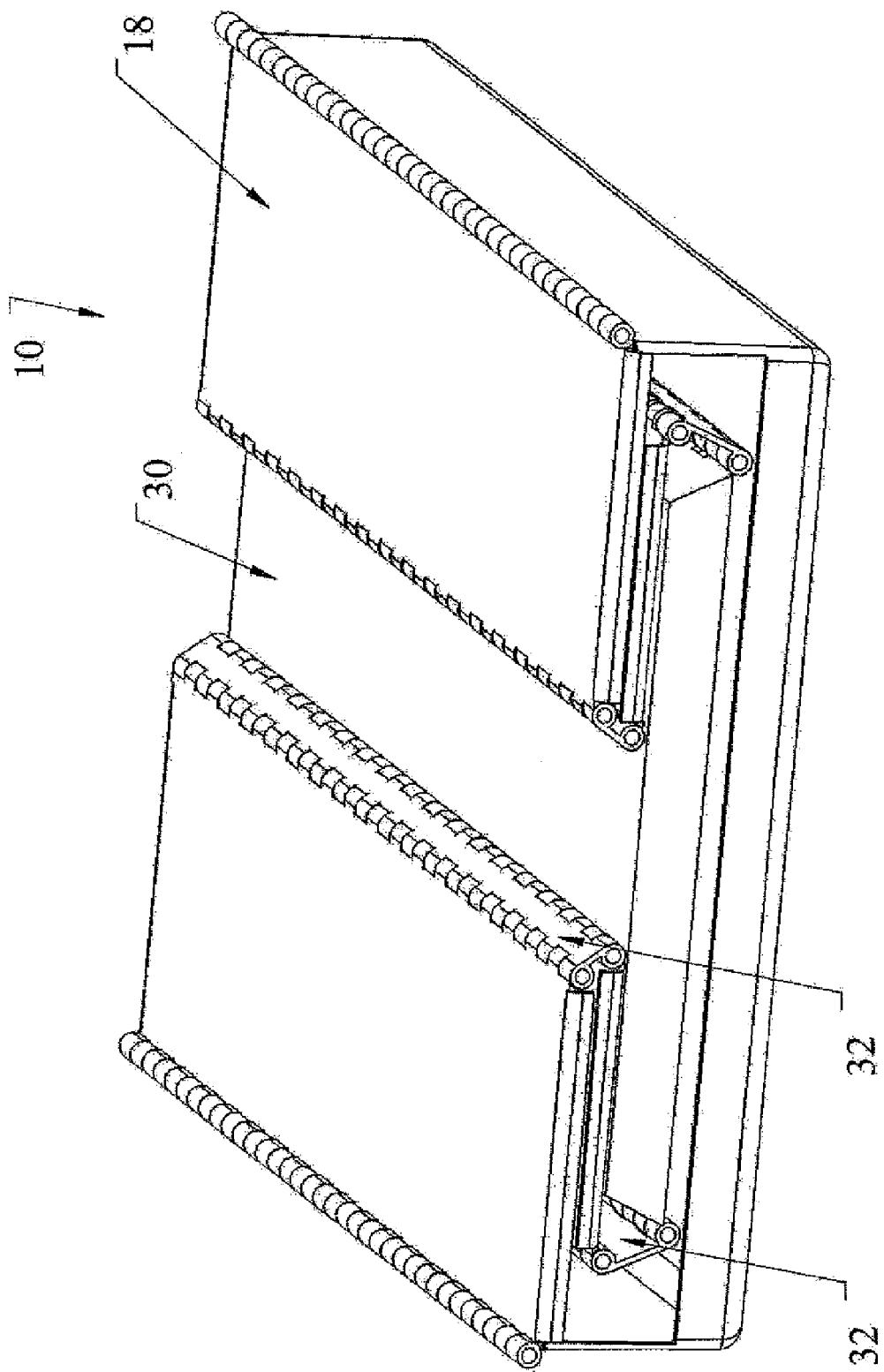
FIG. 9 is a perspective view of the structure of FIG. 8 illustrating the structure in a fully collapsed condition.

FIG. 8 is a perspective view of another exemplary embodiment of the present invention, illustrating two relatively wide hinge panels 32 per side, providing additional height and storage space. One of the relatively wide hinge panels 32 is illustrated as connecting the roof 30 and upper section 16 and the other hinge panel connects upper section 16 and middle section 18, respectively. FIG. 8A illustrates that the hinge panel 32 may also connect the middle side section 18 to the base 28. FIG. 9 illustrates the structure of FIG. 8 in a collapsed condition.

Figure 9A:
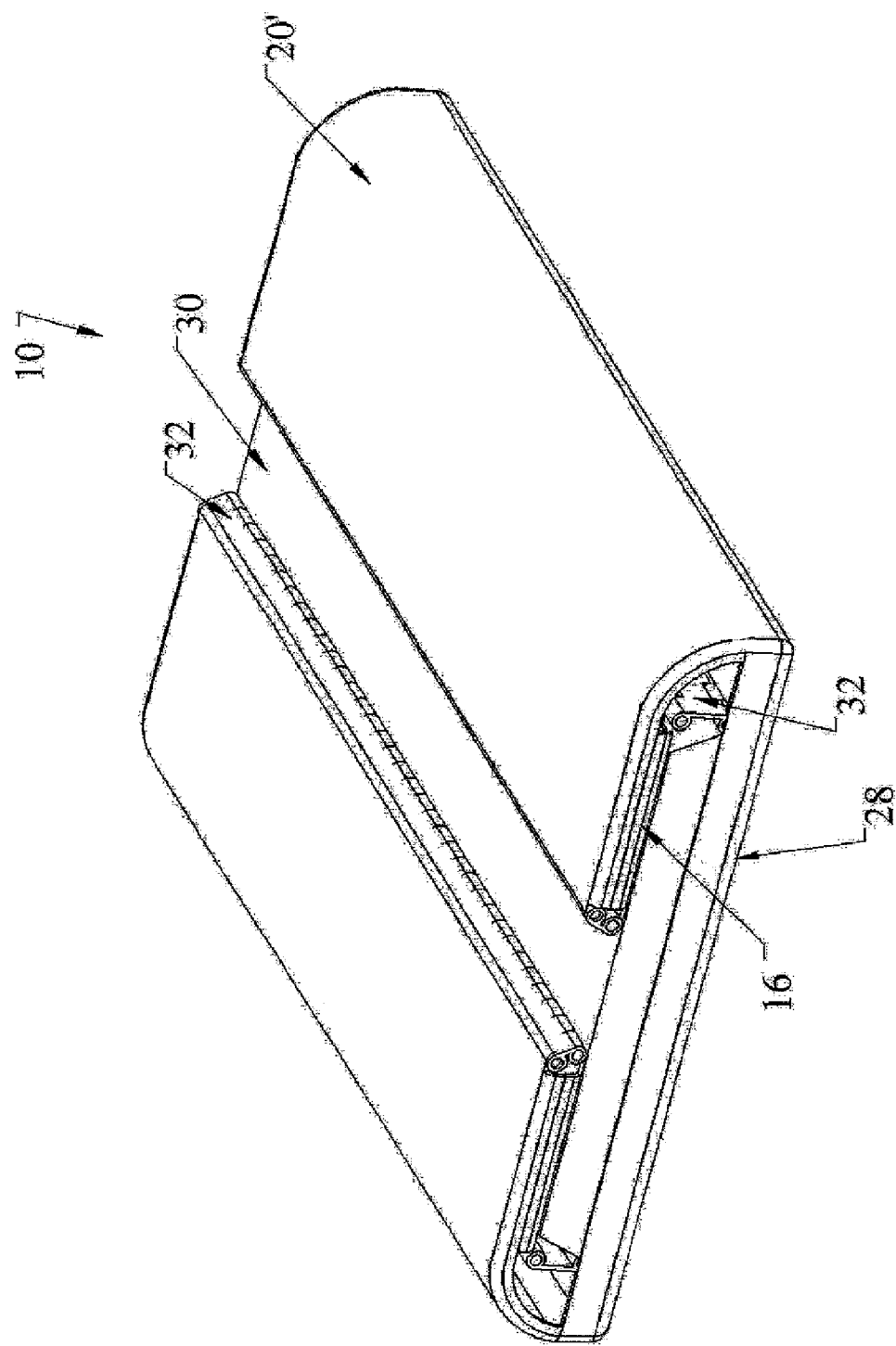
FIG. 9A is a perspective view of a structure similar to FIG. 8 but illustrating flexible lower sidewalls in a fully collapsed condition.

FIG. 9A illustrates yet another exemplary embodiment of the present invention where the middle side section may be replaced by a relatively flexible lower section 20' which may be an extension of the base 28. The flexible lower side section 20' may then extend integrally from the base 28 and be pivotably connected to the upper side section 16. It also may be separately attached to the base. The structure 10 is shown in a collapsed condition in FIG. 9A illustrating that the lower side section 20' is capable of bending such that upon collapse of the roof 30 towards the base 28, the lower side section may overlie the upper side section 16. Or, stated another way, the upper and lower side sections include inner and outer surfaces wherein the upper side section is pivotably attached to the lower side section and permits the lower side section inner surface to collapse into an overlying position with the inner surface of said upper side section The lower side section may comprise a flexible plastic material, such as a polyolefin (i.e. polyethylene, polypropylene, etc.) or a thermoplastic elastomer (e.g., a polyurethane or polyester elastomer), plasticized PVC, a thermoset elastomer, a diene rubber (e.g., cis-polyisoprene), or mixtures thereof.

Figure 10:
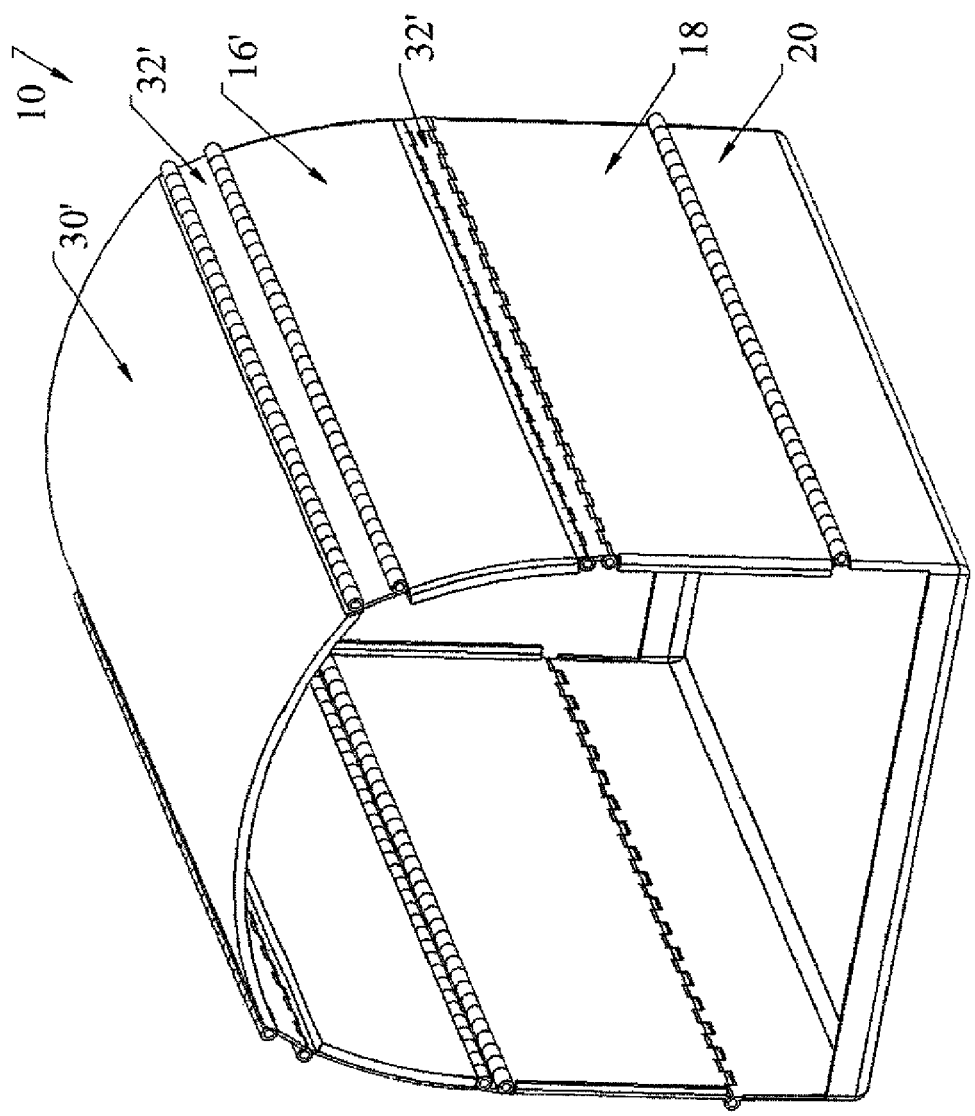
FIG. 10 is a perspective view of a fifth exemplary embodiment of the present invention, illustrating curved upper side walls, two wide hinges and a convex roof to provide additional storage space.
Figure 11:
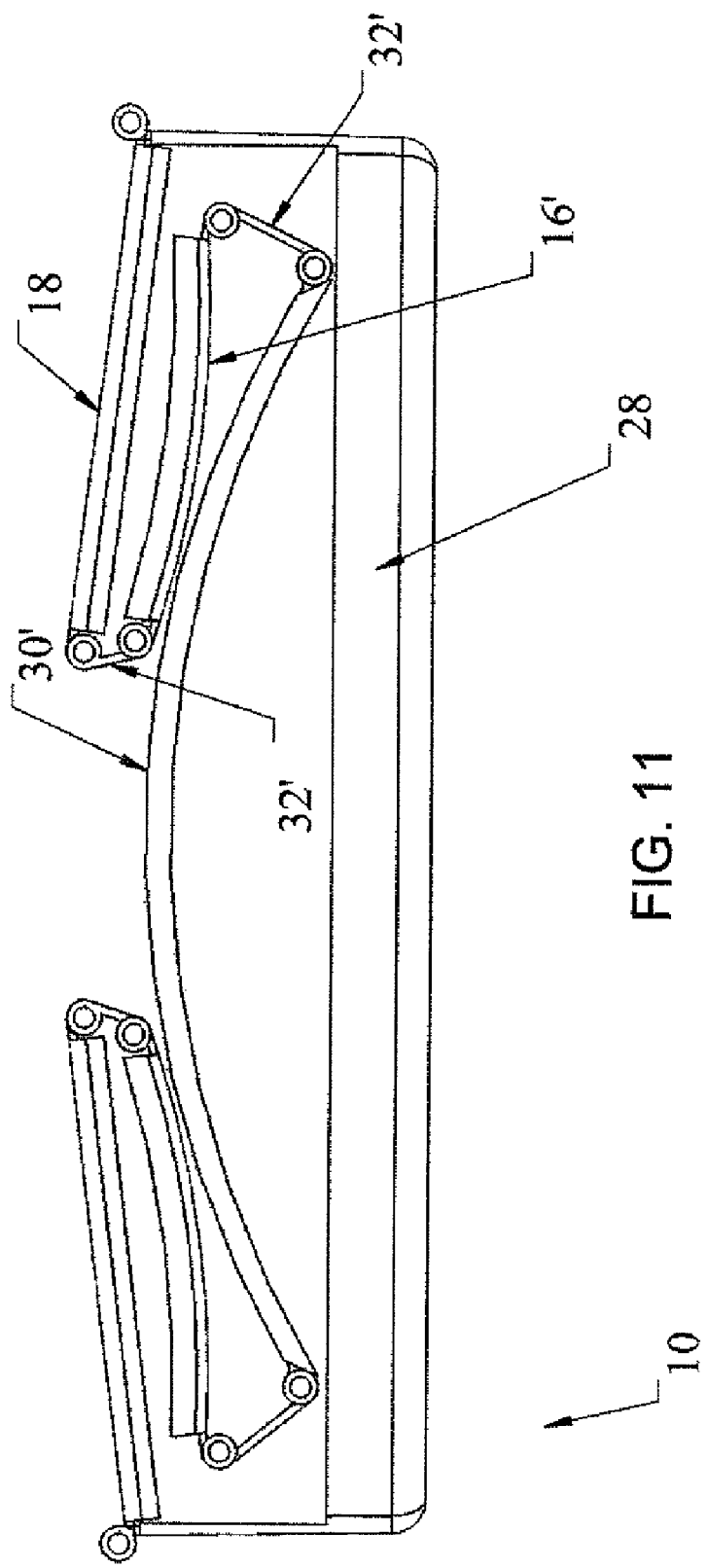
FIG. 11 is an end view of the structure of FIG. 10 in a fully collapsed condition.

FIG. 10 is a perspective view of another exemplary embodiment of the present invention, illustrating curved upper side walls 16', two relatively wide hinge panels 32' and a convex roof 30' to provide additional storage space. FIG. 11 is an end view of the structure of FIG. 10 in a fully collapsed condition.

The structure of the present invention may comprise any of a variety of materials, including but not limited to, metal, plastic, paperboard, fabric or cloth and wood. In the case of storage for temperature conditioning of items (use as a cooler, etc.), the structure may be formed from thermally insulative materials such as polyurethane, polyolefin or polystyrene foam, optionally containing a film covering the outer surfaces that prevents weather damage to the foam layer, further providing a better or improved cosmetic appearance. In addition, other foam materials are suitable, including but not limited polyurea/urethane, polyurea, and trimer foams, etc. Accordingly, in broad embodiment, any synthetic foam material that provides thermal insulation and temperature control of the interior of the foldable/collapsible structure will be suitable for construction of the present invention. It is further contemplated that in the case of storage coolers, the front and rear end panels may be formed integrally with the base and lower side sections and the end panels connected by living hinges to provide a seal such that liquid contained within the cooler would not leak to the outside.

For use as a pet shelter or carrier, exposed surfaces of the structure may be coated with or constructed of plastic materials, including, but not limited to polyolefins, vinyl polymers, styrene based polymers, acrylonitrile-butadiene-styrene resins, vinyl polymer resins, engineering thermoplastics, and thermoset type resins or coatings which may provide the necessary barrier to chewing destruction of an animal.

The description and drawings illustratively set forth the presently preferred invention embodiment. In addition, it should be understood that all of the aforementioned features of the various embodiments are interchangeable. We intend the description and drawings to describe this embodiment and not to limit the scope of the invention. Obviously, it is possible to modify these embodiments while remaining within the scope of the following claims. Therefore, within the scope of the claims one may practice the invention otherwise than as the description and drawings specifically show and describe.

What is claimed is:

1. A collapsible/foldable structure comprising:
a roof and a base defining a top and bottom of said structure;
a lower side section permanently affixed along each side of said base;
a pair of sidewalls, each comprising at least two sections, each section pivotally attached to said roof to facilitate inward collapse of said sidewalls when said sidewalls are pivoted toward said base, said sidewalls each comprising upper and middle sections, wherein said upper and middle sections are pivotally attached to one another and wherein said roof can collapse downwardly toward said base;
said sidewalls having an outer and an inner surface thereof, the middle wall section being pivotally attached to the lower side section to permit folding of said middle sidewall inwardly toward said base;
said upper wall section being pivotally attached to said middle wall section to permit said middle wall section inner surface to collapse into an overlying and contacting position with the inner surface of said upper wall section and said roof being pivotally connected to said two upper sidewall sections to permit said roof to be collapsed towards said base,
wherein said outer surface of said upper section and said outer surface of said middle section never form an acute angle with one another.

2. The structure of claim 1 including front and rear collapsible panels each movably positioned relative to said lower side section and which are configured to collapse inwardly into said collapsible/foldable structure so that said front and rear collapsible panels may overlie one another and one of said front and rear collapsible panels may overlie said base.

3. The structure of claim 1 wherein the outer surface of said upper side wall and the outer surface of the adjacent middle side wall form an angle that is greater than 180 degrees when the structure is in an expanded or collapsed condition.

4. The structure of claim 1 wherein said pivotal attachments comprise hinges.

5. The structure of claim 4 wherein one or more of said hinges comprise a living hinge.

6. The structure of claim 5 wherein said living hinge integrally extends between the inner surfaces of said upper and said middle wall sections.

7. The structure of claim 1 wherein at least one of said pivotal attachments comprise hinges panels which include a pair of spaced-apart hinges.

8. The structure of claim 7 wherein said hinges panels comprise a flexible material capable of bending.

9. The structure of claim 8 wherein said hinges panels comprise one of leather, cloth, thermoplastic olefin or thermoplastic elastomer.

10. The structure of claim 1 wherein one or more of said roof, said upper sidewall section and said middle sidewall section are curved.

11. The structure of claim 7 wherein said hinge panels are curved.

12. The structure of claim 1 wherein said roof further includes an access panel for accessing items stores within said structure.

13. The structure of claim 1 wherein said front and rear walls are detachable from said base.

14. The structure of claim 4 wherein said hinges extend discontinuously along said side sections.

15. A foldable/collapsible structure comprising:
a horizontally disposed bottom panel and a lower side section;
a top panel;
a pair of side walls, each defined by at least an upper and middle side sections including said lower side section;
wherein said upper side section is hingedly connected to said top panel and to said middle side section, said middle section is hingedly connected to said lower side section, wherein said side panels can be pivoted inwardly towards said bottom panel;
wherein said upper and said middle side sections include inner and outer surfaces and wherein the upper wall section being hingedly attached to said middle wall section permits said middle wall section inner surface to collapse into an overlying and contacting position with the inner surface of said upper wall section.

16. The structure of claim 15 including first and second end panels hingedly attached to said lower side section.

17. The structure of claim 15 wherein the outer surface of said upper side section and the outer surface of the adjacent middle side section form an angle that is greater than 180 degrees when the structure is in an expanded or collapsed condition.

18. A pet carrier for transporting or temporarily storing pets comprising:
- a top roof and a bottom platform defining a top and a bottom of said carrier;
- a pair of sidewalls each pivotally attached to said roof to facilitate inward collapse of said sidewalls when said sidewalls are pivoted toward said bottom platform,
- said sidewalls further containing at least an upper, middle and lower section, wherein said upper and middle sections and said middle and lower sections are pivotally attached to one another so that said upper and middle sections can be pivoted inwardly towards said bottom platform,
- wherein said upper and said middle sections include inner and outer surfaces and wherein the upper section being pivotally attached to said middle section permits said middle section inner surface to collapse into an overlying and contacting position with the inner surface of said upper section.

19. The structure of claim 18 wherein the outer surface of said upper side section and the outer surface of the adjacent middle side section form an angle that is greater than 180 degrees when the structure is in an expanded or collapsed condition.

20. A foldable/collapsible structure comprising:
- a top panel, a bottom panel, and a lower side section;
- a pair of side panels, each defined by at least two sections including an upper and middle side section;
- wherein said upper side section is pivotally connected to said top panel and to said middle side section,
- wherein said upper and middle side sections include inner and outer surfaces and wherein the upper side section being pivotably attached to said middle side section permits said middle side section inner surface to collapse inwardly into an overlying and contacting position with the inner surface of said upper side section.

21. The structure of claim 20 wherein said lower side section comprises a material capable of bending to form said overlying condition.

\* \* \* \* \*